(12) United States Patent
Miller et al.

(10) Patent No.: US 8,196,145 B2
(45) Date of Patent: Jun. 5, 2012

(54) DETERMINING REAL TIME STATEFUL BUSINESS APPLICATION PROCESSING IN AN OTHERWISE STATELESS SERVICE-ORIENTED ARCHITECTURE

(75) Inventors: Landon C. Miller, Tuscaloosa, AL (US); Siljan H. Simpson, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 12/147,014

(22) Filed: Jun. 26, 2008

(65) Prior Publication Data

US 2009/0328040 A1    Dec. 31, 2009

(51) Int. Cl.
*G06F 9/46* (2006.01)
*G06F 15/173* (2006.01)

(52) U.S. Cl. ......... 718/106; 718/103; 718/104; 709/224
(58) Field of Classification Search ................. None
See application file for complete search history.

(56) References Cited

U.S. PATENT DOCUMENTS

| | | | | |
|---|---|---|---|---|
| 5,838,968 | A * | 11/1998 | Culbert | 718/104 |
| 2002/0031086 | A1 * | 3/2002 | Welin | 370/229 |
| 2006/0143031 | A1 * | 6/2006 | Bou-Ghannam et al. | 705/1 |
| 2006/0143229 | A1 * | 6/2006 | Bou-Ghannam et al. | 707/104.1 |
| 2008/0312778 | A1 * | 12/2008 | Correa et al. | 701/3 |

* cited by examiner

*Primary Examiner* — Eddie P Chan
*Assistant Examiner* — William Partridge
(74) *Attorney, Agent, or Firm* — Brandon C. Kennedy; John R. Pivnichny; Biggers & Ohanian, LLP.

(57) ABSTRACT

Methods, apparatus, and products for deterministic real time stateful business application processing in an otherwise stateless service-oriented architecture ('SOA'), the SOA including SOA services with each SOA service carrying out a processing step of the business application, each SOA service is a real time process executable on a real time operating system of a generally programmable computer and business application processing according to embodiments of the present invention includes: configuring each service of the SOA to record state information describing the state of the service upon completion of a processing step in the business application and provide the state information to a subsequent service, the state information including real time processing information; and executing the business application in the SOA in real time, including sending requests for data processing among the services, each such request comprising a specification of the state of the executing business application.

17 Claims, 4 Drawing Sheets

DETERMINING REAL TIME STATEFUL BUSINESS APPLICATION PROCESSING IN AN OTHERWISE STATELESS SERVICE-ORIENTED ARCHITECTURE

BACKGROUND OF THE INVENTION

1. Field of the Invention

The field of the invention is data processing, or, more specifically, methods, apparatus, and products for deterministic real time stateful business application processing in an otherwise stateless service-oriented architecture ('SOA').

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The execution of complex and computationally intense stateful processes in a service-oriented architecture is currently difficult due to many factors including, for example, process execution management delivered in a single, tightly-coupled stateful description of the process, tight relationships between the processing code and the data whose structure, relationships, and processing rules implicitly or explicitly are contained in both the processing code and the data, and the need to store intermediate states of the data in databases as the data is passed among a number of process steps, each of which may be very complex. These factors result in a very complex computing environment in which input data into such a process executed in the computing environment, the stateful data that is produced at each step in the process, the output data of the process, the logical flow of the process and each step, and the processing code is intertwined such that a reversal of the process, resuming the processes in mid-execution, or understanding of the state of the process at any particular steps in the process is difficult, if not impossible. Additionally, a process executed in such an environment and the environment itself is very expensive to design, build, maintain, and or replace once fully implemented. Not only is stateful business application processing in current service-oriented architectures inefficient, difficult to implement, and costly to maintain, such processing cannot currently be carried out efficiently in deterministic real time.

SUMMARY OF THE INVENTION

Methods, apparatus, and products for deterministic real time stateful business application processing in an otherwise stateless service-oriented architecture ('SOA'), the SOA including SOA services with each SOA service carrying out a processing step of the business application, each SOA service is a real time process executable on a real time operating system of a generally programmable computer and business application processing according to embodiments of the present invention includes: configuring each service of the SOA to record state information describing the state of the service upon completion of a processing step in the business application and provide the state information to a subsequent service, the state information including real time processing information; and executing the business application in the SOA in real time, including sending requests for data processing among the services, each such request comprising a specification of the state of the executing business application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
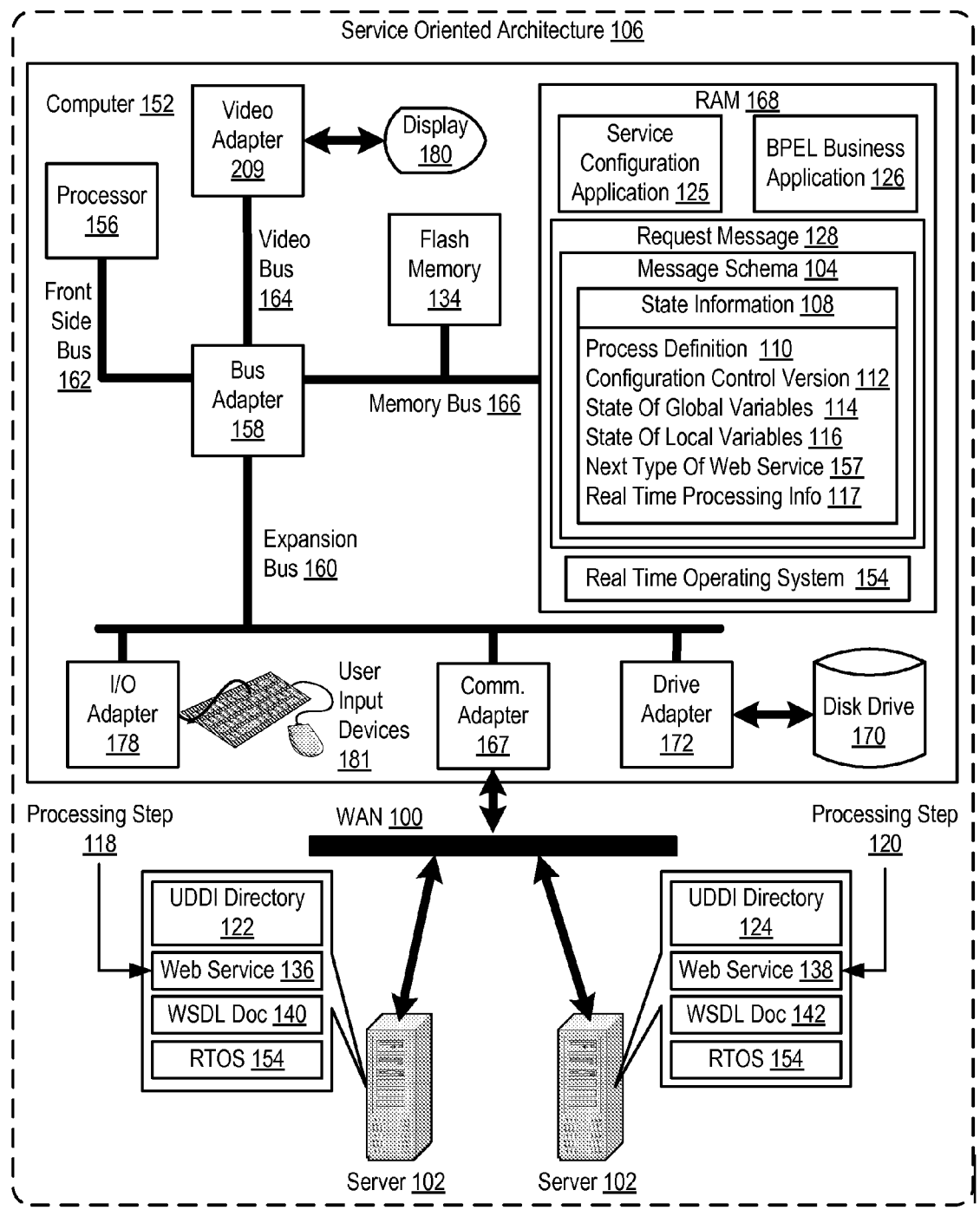
FIG. 1 sets forth a functional block diagram of an exemplary system for deterministic real time stateful business application processing in an otherwise stateless SOA according to embodiments of the present invention.

Exemplary methods, apparatus, and products for deterministic real time deterministic real time stateful business application processing in an otherwise stateless SOA in accordance with the present invention are described with reference to the accompanying drawings, beginning with FIG. 1. FIG. 1 sets forth a functional block diagram of an exemplary system for deterministic real time stateful business application processing in an otherwise stateless SOA (106) according to embodiments of the present invention. SOA is a software architecture in which functionality is grouped around business processes and packaged as interoperable services. SOA may also describe an information technology ('IT') infrastructure which allows different applications to exchange data with one another as they participate in business processes. The focus of SOA is a loose coupling of services with operating systems, programming languages, and other technologies which support software applications. SOA separates functions into distinct units, or services, which are made accessible over a network such that the services may be combined and reused in the production of business applications. These services communicate with each other by passing data from one service to another, or by coordinating an activity between two or more services. SOA concepts are often seen as built upon, and evolving from older concepts of distributed computing and modular programming.

The SOA of FIG. 1 includes two SOA services, implemented here as a pair of interoperable web services (136, 138). An SOA service is a module of computer program instructions, implemented in a service-oriented architecture with other services, which when executed provides a well-defined service. Each SOA service (136, 138) in the example of FIG. 1 is a real time process executable on a real time operating system of a generally programmable computer, such as the computer (152) or servers (102). A real time operating system ('RTOS') is a multitasking operating system intended for real-time applications. Examples of such real-time applications may include embedded systems (e.g., programmable thermostats, household appliance controllers, mobile telephones), industrial robots, spacecraft, industrial control, scientific research equipment, and business application processed in an SOA in accordance with embodiments of the present invention.

In many real time operating systems, a process may be in one of three states from the perspective of the operating system: running, ready, or blocked. Most processes are blocked, most of the time. Only one process per processor or hardware thread is running. In some systems, the ready list is usually short, two or three tasks at most.

An RTOS does not necessarily have high throughput, but rather, an RTOS provides facilities which may guarantee real time deadlines can be met generally (soft real time) or deterministically (hard real time). An RTOS is valued more for how quickly and predictably it can respond to a particular event rather than for the given amount of work it can perform over time. Key factors in an RTOS are therefore a minimal interrupt latency and a minimal thread switching latency.

RTOS may be event driven or time-sharing in executing processes. Event-driven, or priority scheduling, real time operating systems switch processes only when an event of higher priority needs service, called preemptive priority. Time-sharing real time operating systems switch processes on a clock interrupt, and on events, called round robin. Time-sharing operating systems switch processes more often than is strictly necessary, but result in smoother, more deterministic multitasking, giving the illusion that a process has sole use of a machine.

A scheduler in the RTOS schedules execution of the processes according to a scheduling algorithm. An RTOS may employ one of many scheduling algorithms in order to execute processes in deterministic real time. Examples of scheduling algorithms used to execute such processes in real time include round-robin scheduling, fixed priority preemptive scheduling, preemptive time slicing, earliest deadline first, and others as will occur to those of skill in the art.

Round-robin scheduling is an algorithm used to schedule execution of processes in a real time operating system which assigns time slices to each process in equal portions and in order, handling all processes without priority. Round-robin scheduling is both simple and easy to implement, and starvation-free. Starvation is a problem in which a process is perpetually denied resources necessary for completion of the process.

Fixed priority preemptive scheduling is an algorithm used to schedule execution of processes in a real time operating system which uses a preemptive scheduler to insure that at any given time, the processor executes the highest priority process of all those processes that are currently ready to execute. The preemptive scheduler has a clock interrupt process that can provide the scheduler with options to switch after a time slice. This algorithm reduces starvation issues by providing resources to a particular task no longer than the time slice.

Earliest deadline first ('EDF') is an algorithm used to dynamically schedule execution of processes in a real time operating system which are placed in a priority queue. Upon a scheduling event, such as a completion of another process, a release of another process from the queue, and the like, the queue will be searched for the process closest to its deadline. This process will then be scheduled for execution next. EDF is an optimal scheduling algorithm on preemptive processors in the following sense: if a collection of independent jobs, each characterized by an arrival time, an execution requirement, and a deadline, can be scheduled, by any algorithm, such that all the jobs complete by their deadlines, the EDF will schedule this collection of jobs such that they all complete by their deadlines.

As mentioned above, the SOA services in the example of FIG. 1 are implemented as pair of web services (136, 138). A web service is defined by the World Wide Web Consortium ('W3C') as "a software system designed to support interoperable Machine to Machine interaction over a network." Web services are frequently web application program interfaces ('APIs') that can be accessed over a network (100), such as the Internet, and executed on a remote system hosting the requested services. The W3C web service definition encompasses many different systems, but in common usage the term refers to clients and servers that communicate using Extensible Markup Language ('XML') messages that follow the Simple Object Access Protocol ('SOAP') standard.

The example web services (136, 138) in the system of FIG. 1 are described in web services description language ('WSDL') in a WSDL document (140, 142). WSDL is an XML-based language that provides a model for describing web services. A WSDL document describes web services as collections of network endpoints, or ports. A port is defined by associating a network address with a reusable binding, and a collection of ports define a service. Messages are abstract descriptions of the data being exchanged, and port types are abstract collections of supported operations. The concrete protocol and data format specifications for a particular port type constitutes a reusable binding, where the operations and messages are then bound to a concrete network protocol and message format. In this way, WSDL documents describe a public interface to the web service.

WSDL is often used in combination with SOAP and XML schema to provide web services over the Internet. A client program connecting to a web service can read the WSDL document to determine services that are available on the server. Any special datatypes used by the service are described in the WSDL document in the form of an XML schema. The client can then use SOAP to actually execute one of the services listed in the WSDL document.

Each web service (136, 138) in the example of FIG. 1 may also be registered in at least one Universal Description, Discovery and Integration ('UDDI') directory (122, 124). A UDDI directory is a platform-independent, XML-based registry for businesses to list services provided by the business on the Internet. UDDI is an open industry initiative, sponsored by OASIS, enabling businesses to publish service listings and discover each other and define how the services or software applications interact over the Internet.

The web services (136, 138) in the example of FIG. 1 are described in WSDL in a WSDL document and registered in a UDDI directory for clarity only. Readers of skill in the art will immediately recognize that web services useful as SOA services that carry out processing steps of a stateful business application according to embodiments of the present invention may be described in descriptive languages other than WSDL and may be registered in directories other than UDDI directories.

In the example of FIG. 1, each SOA service (136, 138) carries out a processing step (118, 120) of the business application. A business application as the term is used in this specification refers to a software application that provides business functionality in an SOA. Examples of business applications include applications that process customer orders, travel planning applications that purchase plane tickets, hotel rooms, reserve rental cars, and others as will occur to those of skill in the art.

A business application, according to embodiments of the present invention, may be a stateful business application. A 'state' is a unique configuration of information in a software program or machine. The term 'stateful,' when used here to describe a business application, refers to the fact that processing steps of the business application process data during execution of the business application in dependence upon the current state of the application. In contrast to the stateful business application executed in the SOA, the SOA itself according to embodiments of the present invention is otherwise stateless. That is, the framework in which the stateful business application is executed, the SOA and the set of SOA services used to execute the business application, is stateless when not executing the business application. When executing the business application, however, each individual service carries out a processing step of the business application—a processing step that processes data in dependence upon the current state of the application. As such, the SOA and its SOA services may be thought of as stateful when used to execute a stateful business application and stateless otherwise.

The system of FIG. 1 includes a computer (152) connected for data communications to other computers through a wide area network (100). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is a service configuration application (125) and a BPEL business application (126).

A BPEL business application (126) is a business application as described above generated in business process execution language ('BPEL') by a BPEL engine. BPEL is a language for specifying business process behavior based on Web Services. A business process or business method is a collection of interrelated tasks which accomplish a particular goal. In the example of FIG. 1, any of the BPEL business application (126) and the web services (136, 148) may implement a business process because each service and the application may be described as a collection of interrelated tasks which accomplish a particular goal.

Business processes can be described in two ways in BPEL, as executable business processes or abstract business processes. Executable business processes model actual behavior of a participant in a business interaction. Abstract business processes are partially specified processes that are not intended to be executed. An abstract process may hide some concrete operational details. Abstract processes serve a descriptive role, with more than one possible use case, including observable behavior and process template. BPEL is meant to be used to model the behavior of both executable and abstract processes. A BPEL engine may generate an executable application in dependence upon such a BPEL description of one or more business processes.

The business application (126) of FIG. 1 is implemented with BPEL for clarity of explanation only. Readers of skill in the art will recognize that in addition to BPEL, SOA services and business applications (126) according to embodiments of the present invention, may be implemented in other ways such as, for example, with a business rules engine, with semantic networking, and the like.

The service configuration application (125) operates generally for deterministic real time stateful business application processing in an otherwise stateless SOA according to embodiments of the present invention. The service configuration application is a module of computer program instructions capable of configuring each service (136, 138) of the SOA to record state information describing the state of the service upon completion of a processing step in the business application and provide the state information to a subsequent service. State information as the term is used in this specification describes a current state of an executing business application. In addition to providing the state information to a subsequent service, the SOA services are also configured to provide business information, that is, output data of the execution of the service, to a subsequent service.

The state information (108) provided to a subsequent service in executing a business application in accordance with embodiments of the present invention includes real time processing information (117). Real time processing information (117) may include a real time processing deadline for the business application (126), a real time processing deadline for each processing step (118, 120) of the business application (126), and others as will occur to readers of skill in the art. A real time processing deadline for the business application (126), for example, may specify that the business application, once executed, must be completed in 1.5 seconds. A real time processing deadline for each processing step, for example, may specify that a first processing step must be completed in 200 milliseconds, a second processing step must be completed in 250 milliseconds and the like. Such processing deadlines for each processing step may be predefined, predetermined, dynamically calculated during execution of the business application and may be implemented in other ways as will occur to those of skill in the art.

The computer (152) in the example of FIG. 1 executes the BPEL business application (126) stored in RAM (168) in the SOA (106) in deterministic real time. Executing the BPEL business application (126) in the SOA (106) in deterministic real time may include sending requests for data processing among the services (136, 138). In the example of FIG. 1, the requests are sent in a request message (128), the structure, content, and semantics of which are defined by a message schema (108). Such a request message may be implemented with Extensible Markup Language ('XML'), HyperText Markup Language ('HTML'), another markup language, or in other ways as will occur to those of skill in the art. The request messages (128) sent among the web services (136, 138) in the example of FIG. 1 may be sent as SOAP requests for real time execution of a processing step of the business application, that is, as data communications messages transmitted in accordance with SOAP protocol.

Each request sent among the services includes a specification of the state of the executing business application. In the example of FIG. 1, the state of the executing business application is specified by state information (108) in the message schema (108). Such state information (108) may include a process definition (110) for the business application (126), a specification of a configuration control version (112) for the business application, a current state of global variables (114), and a current state of local variables (116).

A process definition (110) for the business application (126) specifies the processing steps, global and local variables, initial values, the order of executing the processing steps, and other elements as will occur to those of skill in the art. Such a process definition (110) may be implemented with BPEL, semantic network diagrams, or other graphical flow diagramming tools, and expressed in a message schema of an XML message, an HTML message, or other markup language message. Readers of skill in the art will recognize that process definitions included in state information according to embodiments of the present invention may be dynamically generated during execution of the business application. That is, an SOA service may determine during execution of the business application that one or more additional processing steps not currently identified in the process definition are necessary for executing the business application and as such, may update the process definition to include such additional processing steps.

A specification of a configuration control version (112) for the business application identifies the current configuration of the business application for purposes of compatibility with SOA services. Because multiple instances of the same SOA service may be distributed across and administered by many different entities, current configuration of each of the multiple instances administered by a different entity may vary. As such, some instances of the SOA service may be configured to record state information describing the state of the service upon completion of a processing step in the business application and provide the state information to a subsequent service, while other instances of the SOA service may not be configured as such. In some embodiments of the present invention, therefore, the configuration control version (112) may be used by an SOA service to determine whether that SOA service is capable of executing a requested processing step in real time, including recording the state information and providing the state information to a subsequent service.

Any SOA service used to execute a processing step of the business application may alter the values of the global variables and local variables. Global variables are those variables accessible in every scope of the business application, that is, by any SOA service carrying out a processing step of the application. Local variables, by contrast, are those variables used by less than all SOA services that carry out processing steps of the business application. Stated another way, a local variable is typically associated with only one processing step while a global variable, by contrast, is associated with any and all processing steps of the business application.

In processing such a stateful business application according to embodiments of the present invention the SOA services, the web services (136, 138) of FIG. 1, are configured to update the current state of global variables (114) and the current state of local variables (116) upon completion of a processing step. In this way, each request sent from a particular SOA service to a subsequent service, carries with it the values of all variables at each service prior to the particular service, that is, during each previous processing step.

The state information (108) in the example of FIG. 1 may also include an identification of a next type of web service (157) to call for a next processing step of the business application. When the state information (108) includes such an identification of a next type of web service (157) to call, executing the business application may also include looking up in an UDDI directory (122, 124) the next type of web service for the next processing step in the business application.

As mentioned above, each SOA service in the example of FIG. 1 may also send along business information, that is, output data of the service, to a subsequent service. The SOA service may send such business information along to a subsequent service by storing the information in the message (128) along with the state information (108). By sending from one SOA service to the next, the state information (108) and the business information in messages, the state information and business information are decoupled from the SOA services and need not be maintained elsewhere, in a centralized database for example, effectively decoupling the information from complex, expensive, and inefficient storage devices.

State information (108) sent in a request for data processing may also include the real time processing information, such as a real time processing deadline for the business application or for each processing step of the business application. Consider as an example that the web service (136) receives a request for data processing which includes a processing deadline of 500 milliseconds for the processing step carried out by the service (136). Upon receipt of the request for data processing, the real time operating system ('RTOS') (154) on which the web service runs, identifies the processing deadline from state information and assigns the service a priority such that the processing deadline is met. Setting the priority of the service such that the processing deadline is met may include inserting the process into a ready list administered by a scheduler of the real time operating system (154) according to any of the previously mentioned scheduling algorithms. During execution of the scheduled service, no other process can preempt the execution except those processes of higher priority. Even when preempted, the scheduler of the RTOS will insure that the preempted service completes execution within the real time deadline.

If the processing deadline in the state information is a real time deadline for the business application, assigning the web service a priority may include calculating a real time deadline for the service in dependence upon a start time of the execution of the business application, the deadline for the business application, and the process definition of the business application. That is, the scheduler may, for example, determine that 1.2 seconds remain for completion of the business application in dependence upon the current time, the start time of the execution of the business application, and the real time deadline of business application. If six processing steps, including the processing step carried out by the web service, are left to be carried out, the scheduler may evenly divide the remaining time for the business application by the number of remaining processing steps, such that the current processing step has a deadline of 200 milliseconds. Readers of skill in the art will recognize that calculating such a real time deadline for the service may be carried out in other ways, such as for example, by dividing the remaining time for the business application unevenly in dependence upon a weight assigned to each processing step.

Also stored in RAM (168) is a real time operating system (154). Real time operating systems useful for deterministic real time stateful business application processing in an otherwise stateless SOA according to embodiments of the present invention include any operating system in having real time capabilities such as RTLinux™, VxWorks™, Microsoft Windows CE™, IBM Transaction Processing Facility™, and others as will occur to those of skill in the art. The operating system (154), service configuration application (125), and BPEL business application (126) in the example of FIG. 1, are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that process stateful business application in an otherwise stateless SOA according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers, such as the servers (102) that host web services (136, 138). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for deterministic real time stateful business application processing in an otherwise stateless SOA according to embodiments of the present invention include modems for wired dial-up communications, Ethernet (IEEE 802.3) adapters for wired data communications network communications, and 802.11 adapters for wireless data communications network communications.

The arrangement of servers, computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
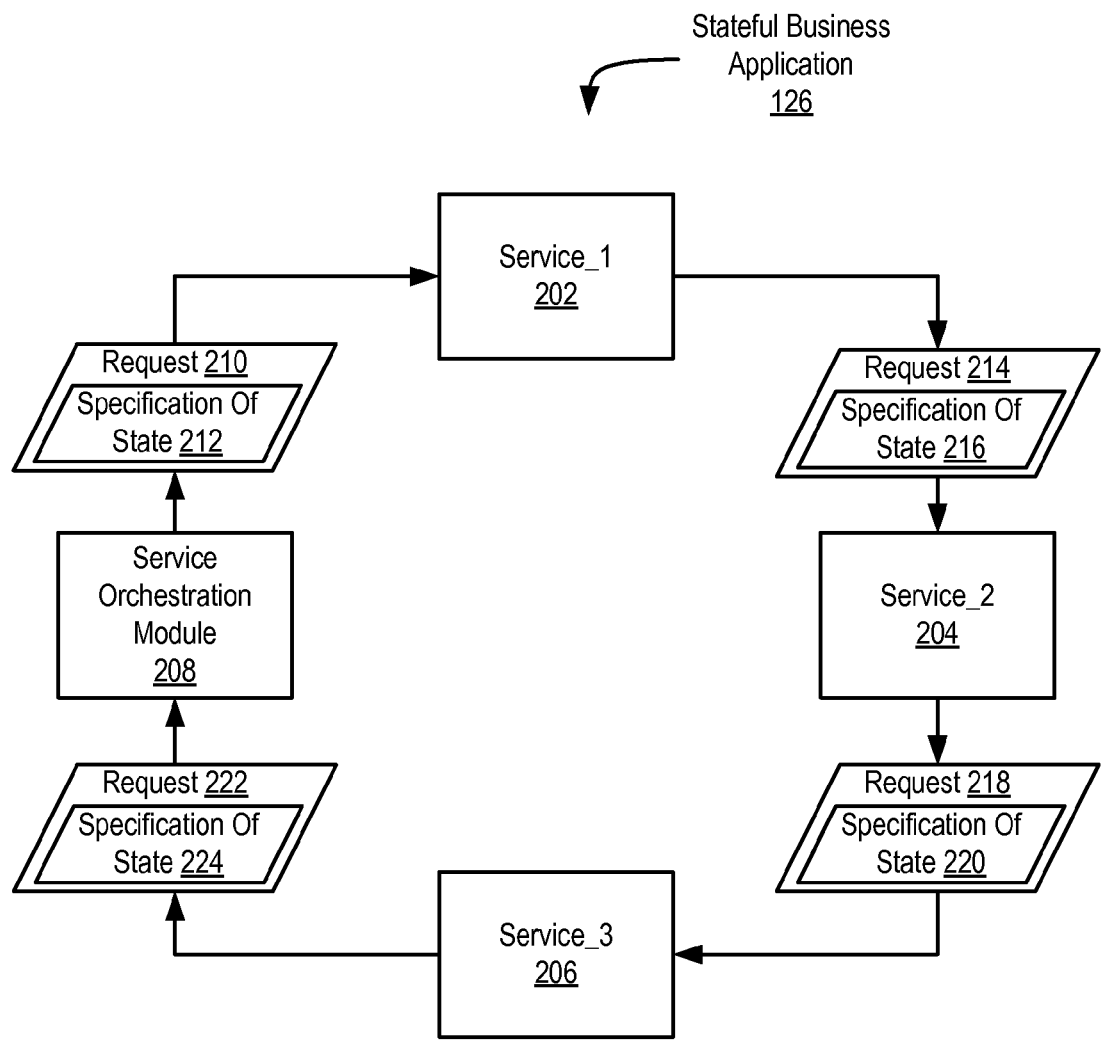
FIG. 2 sets forth a block diagram illustrating an exemplary stateful business application processed in deterministic real time in an otherwise stateless SOA in accordance with embodiments of the present invention.

For further explanation, FIG. 2 sets forth a block diagram illustrating an exemplary stateful business application (126) processed in deterministic real time in an otherwise stateless SOA in accordance with embodiments of the present invention. The stateful business application, in the example of FIG. 2, includes three services, service_1 (202), service_2 (204), and service_3 (206). Each of the services is configured to record state information describing the state of the service upon completion of a processing step in the business application and provide the state information to a subsequent service. The state information includes real time processing information. Each service in the example of FIG. 2 carries out one processing step of the business application (126).

The business application (126) also includes a service orchestration module (208), a module of computer program instructions capable of initiating a first processing step of the stateful business application (126) and terminating the business application upon completion of all business processing steps of the business application. In the example of FIG. 2, when the business application (126) is executed, the service orchestration module (208) sends a request (210) to serviced_ (202) for data processing. The request (210) includes a specification of the state (212) of the executing business application.

Service_1 (202) carries out a processing step of business application (126) in dependence upon the request and the state information that specifies the state of the executing business application. The service_1 (202) carries out the processing step in real time in dependence upon the real time processing information contained in the specification of state (212) received in the request (210) for data processing. Upon completion of the processing step, serviced_1 (202) records in the specification (212) current state information of the currently executing business application. Service_1 then provides the specification, with the current state information, to the subsequent service, service_2 (204). In addition to the specification (212) of the state of the executing business application, the request (210) may also include business information, that is, output data produced by the execution of service_1 (202).

Service_2 (204) carries out a processing step of business application (126) in dependence upon the request (210) and the state information (212), including the information recorded by service_1. The service_2 (204) carries out the processing step in real time in dependence upon the real time processing information contained in the specification of state (212) received in the request (210) for data processing. Upon completion of the processing step, service_2 (204) records in the specification (212) additional current state information of the currently executing business application. Service_2 then provides the specification, with the additional current state information, to the subsequent service, service_3 (206). In addition to the specification (212) of the state of the executing business application, the request (210) may also include business information, that is, output data produced by the execution of service_2 (204).

Service_3 (206) carries out a processing step of business application (126) in dependence upon the request (210) and the state information, including the information recorded by service_2 and service_1. The service_3 (206) carries out the processing step in real time in dependence upon the real time processing information contained in the specification of state (212) received in the request (210) for data processing. Upon completion of the processing step, service_3 (206) records in the specification (212) additional current state information of the currently executing business application. Service_3 then provides the specification, with the additional current state information, to the subsequent service, in this example the service orchestration module (208). In addition to the specification (212) of the state of the executing business application, the request (210) may also include business information, that is, output data produced by the execution of service_3 (206). The service orchestration module (208) process any data necessary in dependence upon the specification of the state which now includes the state information recorded by service_1, service_2, and service_3, and terminates the business application.

Figure 3:
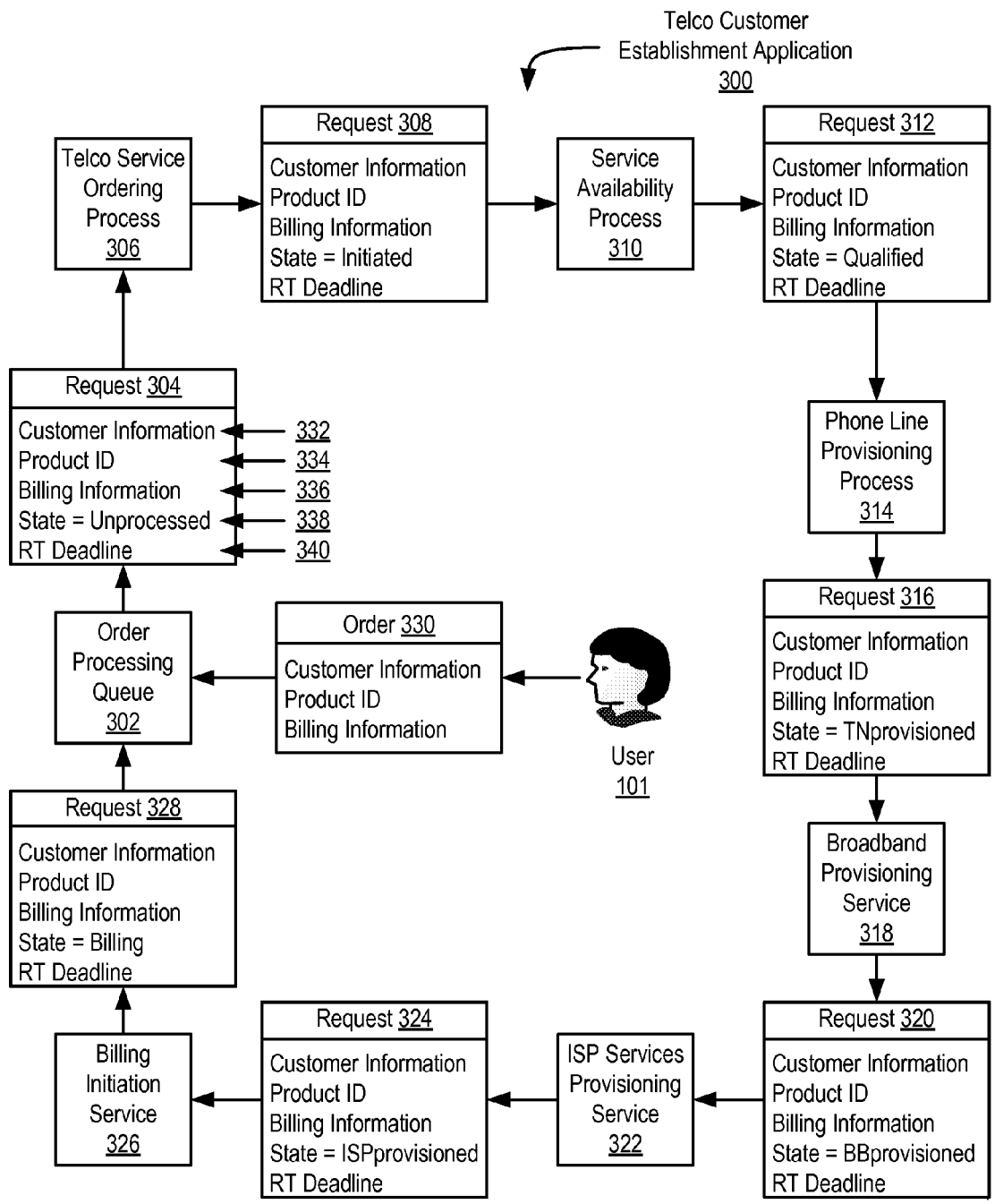
FIG. 3 sets forth a block diagram illustrating another exemplary stateful business application processed in deterministic real time in an otherwise stateless SOA in accordance with embodiments of the present invention.

For further explanation, FIG. 3 sets forth a block diagram illustrating another exemplary stateful business application processed in deterministic real time in an otherwise stateless SOA in accordance with embodiments of the present invention. The stateful business application in the example of FIG.

3 is a 'Telco' customer establishment application (300) used by a telephone and internet provider to process new customer orders (330). The term 'Telco' refers generally to a telephone company that may provide telephone services, broadband Internet services, and the like. The application (300) includes seven services: an order queue service (302), an order initiation service (306), a service availability service (310), a phone line provisioning service (314), a broadband provisioning service (318), an internet service provider ('ISP') provisioning service (322), and a billing initiation service (326).

Each of the services is configured to record state information describing the state of the service upon completion of a processing step in the business application and provide the state information to a subsequent service. Each service in the example of FIG. 3 carries out one processing step of the business application (126) in deterministic real time.

The order queue service (302) is a module of computer program instructions capable of receiving an order (330) from a user (101) for establishing telephone services. Such an order (330) may include, for example, customer information (332), including the user's name and address, an identification (334) of the product selected by the user, such as particular broadband and long-distance plans, and the user's billing information (336), such as a billing address. Upon receiving such an order (330), the order queue service may insert the order into a queue behind previously received orders. When the received order (330) is ready for processing, the order queue service sends a request (304) for processing to the order initiation service (306). The request (304) includes business information, such as customer information, product identification, and billing information, along with a specification of the state (338) of the executing business application. The request (304) also includes real time processing information in the form of a real time ('RT') deadline (340) for next processing step. In this example, the request (304) includes state information that indicates the state of the business application as 'unprocessed.'

The order initiation service (306) processes the request (304) in real time in accordance with the real time deadline and initiates the processing of the user's order (330), that is, the establishment of the user's selected products. The order initiation service process (306) may, for example, assign the user's order a unique identification to use during the execution of the application (300) and store such identification in a database in association with the customer information, product identification, and billing information included in the order. Upon completion of the processing step carried out by the order initiation service (306), the order initiation service (306) records in a request (308) for data processing business information produced by the service and a specification of the state of the executing business application that includes state information indicating the current state of the application (300) as 'initiated.' The order initiation service (306) then provides the request (308) for data processing, including the specification of state and the business information to the subsequent service, the service availability service (310). The request (308) also includes real time processing information in the form of a real time ('RT') deadline (340) for next processing step.

The service availability service (310) processes the request (308) in real time in accordance with the real time deadline and checks availability of the products selected by the user (101). The service availability service (310) may, for example, search a database that associates zip codes, streets, and indications of service availability for each product selected by the user to determine whether the selected products are available and for each product available update a record in a database in association with the unique identification of the user's order assigned by the order initiation service. Upon completion of the processing step carried out by the service availability service (310), the service availability service (310) records in a request (312) for data processing business information produced by the service and a specification of the state of the executing business application that includes state information indicating the current state of the application (300) as 'qualified.' The service availability service (310) then provides the request (312) for data processing, including the specification of state and the business information to the subsequent service, the phone line provision service (314). The request (312) also includes real time processing information in the form of a real time ('RT') deadline (340) for next processing step.

The phone line provisioning service (314) processes the request (312) in real time in accordance with the real time deadline and provisions a telephone line for the user (101). The phone line provisioning service (314) may, for example, associate, in a database, a telephone number with the user's address or with the unique identification of the user's order assigned by the order initiation service. Upon completion of the processing step carried out by the phone line provisioning service (314), the phone line provisioning service (314) records in a request (316) for data processing business information produced by the service and a specification of the state of the executing business application that includes state information indicating the current state of the application (300) as 'TNprovisioned,' that is, telephone number provisioned. The phone line provisioning service (314) then provides the request (316) for data processing, including the specification of state and the business information to the subsequent service, the broadband provisioning service (318). The request (316) also includes real time processing information in the form of a real time ('RT') deadline (340) for next processing step.

The broadband provisioning service (318) processes the request (316) in real time in accordance with the real time deadline and provisions broadband for the user (101). The broadband provisioning service (318) may, for example, associate, in a database, an Internet Protocol ('IP') address with the user's address or with the unique identification of the user's order assigned by the order initiation service. Upon completion of the processing step carried out by the broadband provisioning service (318), the broadband provisioning service (318) records in a request (320) for data processing business information produced by the service and a specification of the state of the executing business application that includes state information indicating the current state of the application (300) as 'BBprovisioned,' that is, broadband provisioned. The broadband provisioning service (318) then provides the request (320) for data processing, including the specification of state and the business information to the subsequent service, the Internet Service Provider ('ISP') services provisioning service (322). The request (320) also includes real time processing information in the form of a real time ('RT') deadline (340) for next processing step.

The ISP services provisioning service (322) processes the request (320) in real time in accordance with the real time deadline and provisions broadband for the user (101). The ISP services provisioning service (322) may, for example, associate, in a database, a domain name, email address, and the like with user's name, address, or the unique identification of the user's order assigned by the order initiation service. Upon completion of the processing step carried out by the ISP services provisioning service (322), the ISP services provisioning service (322) records in a request (324) for data processing business information produced by the service and a specification of the state of the executing business application that includes state information indicating the current state of the application (300) as 'ISPprovisioned,' that is, ISP services provisioned. The ISP services provisioning service (322) then provides the request (324) for data processing, including the specification of state and the business information to the subsequent service, the billing initiation service (326). The request (324) also includes real time processing information in the form of a real time ('RT') deadline (340) for next processing step.

The billing initiation service (326) processes the request (324) in real time in accordance with the real time deadline and provisions broadband for the user (101). The billing initiation service (326) may, for example, associate, in a database, an Internet Protocol ('IP') address with the user's address or with the unique identification of the user's order assigned by the order initiation service. Upon completion of the processing step carried out by the billing initiation service (326), the billing initiation service (326) records in a request (328) for data processing business information produced by the service and a specification of the state of the executing business application that includes state information indicating the current state of the application (300) as 'billing.' The billing initiation service (326) then provides the request (328) for data processing, including the specification of state and the business information to the subsequent service, the order queue service (302). The request (328) also includes real time processing information in the form of a real time ('RT') deadline (340) for next processing step. Upon receiving the request for data processing indicating that the state of the business application is 'billing' the order queue service removes the order (330) from the queue in real time in accordance with the real time deadline, effectively terminating the business application (300) for that order.

Figure 4:
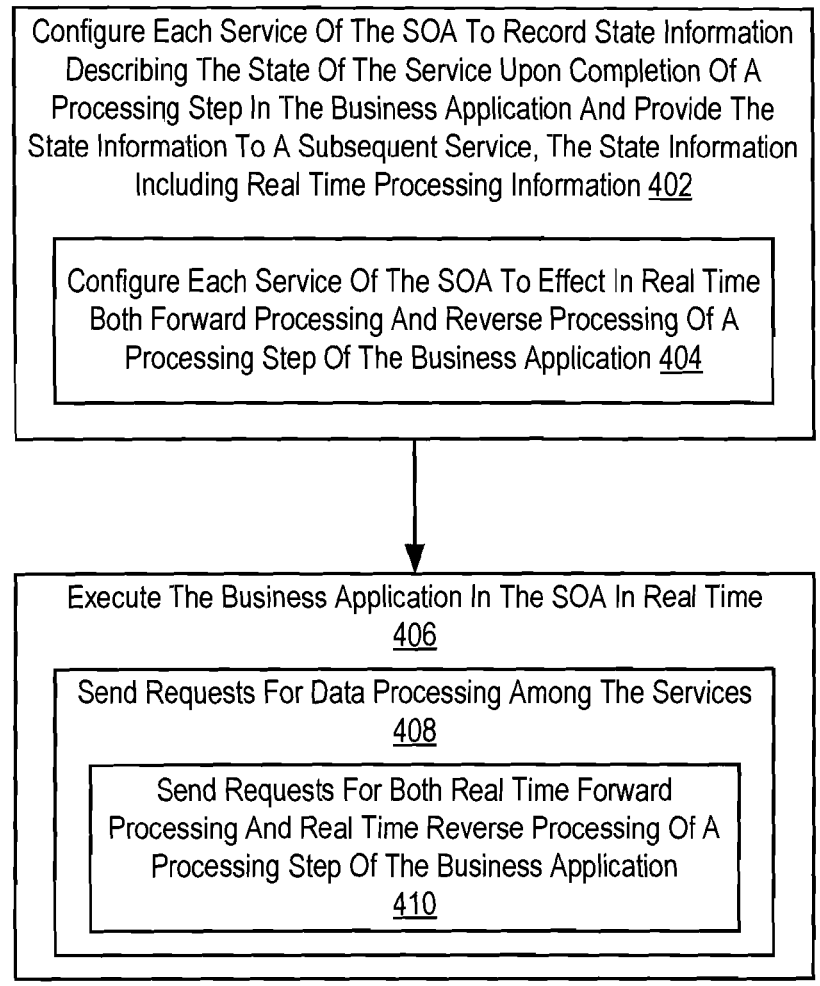
FIG. 4 sets forth a flow chart illustrating an exemplary method for deterministic real time stateful business application processing in an otherwise stateless SOA according to embodiments of the present invention.

For further explanation, FIG. 4 sets forth a flow chart illustrating an exemplary method for deterministic real time stateful business application processing in an otherwise stateless SOA according to embodiments of the present invention. The SOA of the method of FIG. 4 is similar to the SOA (106) illustrated in the example of FIG. 1 including at is does SOA services (136 and 138 on FIG. 1) where each SOA service carries out a processing step (118 and 120 on FIG. 1) of the business application.

The method of FIG. 4 includes configuring (402) each service of the SOA to record state information describing the state of the service upon completion of a processing step in the business application and provide the state information to a subsequent service. In the method of FIG. 4, configuring (402) each service of the SOA also includes configuring (404) each service of the SOA to effect in real time both forward processing and reverse processing of a processing step of the business application. Forward processing is the processing of data in a business application in one state to a subsequent, that is, later, state. Reverse processing is the processing of data in a business application in one state to a prior, that is, earlier state. Consider, as an example the phone line provisioning service (314) in the example of FIG. 3. Forward processing by the phone line provisioning service (314) begins with a request for data processing indicating a state of 'qualified,' a state in which a telephone line has not been provisioned for a user. Such forward processing results in a telephone number associated in a database with a unique order identification or with a user's name or address. Reverse processing by the phone line provisioning service (314 on FIG. 3) begins with a request for data processing indicating a state of 'BBprovi-sioned,' 'ISPprovisioned' or 'Billing,' a state in which a telephone line has been provisioned for a user. Such reverse processing results in a removal of a record in a database that previously associated a telephone number with a unique order identification or with the user's name or address. Such reverse processing may also result in the addition of the telephone number previously associated with the unique order identification in a list of telephone numbers available for provisioning.

The method of FIG. 4 also includes executing (406) the business application in the SOA. Executing (406) the business application in the SOA includes sending (408) requests for data processing among the services where each such request includes a specification of the state of the executing business application. In the method of FIG. 4, sending (408) requests for data processing among the services includes sending (410) requests for both real time forward processing and real time reverse processing of a processing step of the business application. Requests for forward or reverse processing may be explicitly identified as such in a message header or the like, or alternatively the type of data processing requested may be implicit in the state recorded in the request and the service receiving the results. A request for data processing, in the Telco customer establishment application (300) of FIG. 3, for example, that indicates the current state of the application as 'TNprovisioned' may be implicitly identified as a request for reverse data processing if received by the phone line provisioning service. That is, having already provisioned a telephone number as indicated in the state information of the request, the phone line provisioning service (314 on FIG. 3) carries out reverse data processing.

In view of the explanations set forth above, readers will recognize that the benefits of stateful business application processing in an otherwise stateless SOA, according to embodiments of the present invention include:
  decoupling the state of a business application from the SOA and SOA services carrying out processing steps of the business application;
  decoupling data produced at each processing step from the SOA and SOA services carrying out the processing steps of the business application;
  permitting asynchronous execution of processing steps in the business application without the need for overall, tightly coupled application execution control;
  enabling full forward and reverse processing of at any state of a stateful business application;
  providing execution of business application in an SOA in real time; and
  others as will occur to those of skill in the art.

Exemplary embodiments of the present invention are described largely in the context of a fully functional computer system for deterministic real time stateful business application processing in an otherwise stateless SOA. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of deterministic real time stateful business application processing in an otherwise stateless service-oriented architecture ('SOA'), the SOA comprising SOA services, each SOA service carrying out a processing step of the business application, each SOA service comprising a real time process executable on a real time operating system of a generally programmable computer, the method comprising:
    configuring each service of the SOA to record state information describing the state of the service upon completion of a processing step in the business application and provide the state information to a subsequent service, the state information including real time processing information, wherein real time processing information includes a real time processing deadline for each processing step of the business application; and
    executing the business application in the SOA in real time, including sending requests for data processing among the services, each such request comprising a specification of the state of the executing business application.

2. The method of claim 1 wherein the real time processing information includes a real time processing deadline for the business application.

3. The method of claim 1 wherein the state of the executing business application further comprises a process definition for the business application, a specification of a configuration control version for the business application, a current state of global variables, and a current state of local variables.

4. The method of claim 1 wherein configuring each service of the SOA further comprises configuring each service of the SOA to effect in real time both forward processing and reverse processing of a processing step of the business application.

5. The method of claim 1 further comprising sending requests for data processing among the services further comprises sending requests for both real time forward processing and real time reverse processing of a processing step of the business application.

6. The method of claim 1 wherein:
    the SOA is implemented with SOA services comprising interoperable web services;
    the web services are described in Web Services Description Language ('WSDL') and registered in at least one Universal Description, Discovery and Integration ('UDDI') directory;
    the state information includes an identification of a next type of web service to call for a next processing step of the business application;
    executing the business application further comprises looking up in a UDDI directory the next type of web service for the next processing step in the business application; and
    sending requests for data processing among the services further comprises sending the requests as Simple Object Access Protocol ('SOAP') requests for real time execution of a processing step of the business application.

7. An apparatus for deterministic real time stateful business application processing in an otherwise stateless SOA, the SOA comprising SOA services, each SOA service carrying out a processing step of the business application, each SOA service comprising a real time process executable on a real time operating system of a generally programmable computer, the apparatus comprising a computer processor, a computer memory operatively coupled to the computer processor, the computer memory having disposed within it computer program instructions capable of:
    configuring each service of the SOA to record state information describing the state of the service upon completion of a processing step in the business application and provide the state information to a subsequent service, the state information including real time processing information, wherein real time processing information includes a real time processing deadline for each processing step of the business application; and
    executing the business application in the SOA in real time, including sending requests for data processing among the services, each such request comprising a specification of the state of the executing business application.

8. The apparatus of claim 7 wherein the real time processing information includes a real time processing deadline for the business application.

9. The apparatus of claim 7 wherein the state of the executing business application further comprises a process definition for the business application, a specification of a configuration control version for the business application, a current state of global variables, and a current state of local variables.

10. The apparatus of claim 7 wherein configuring each service of the SOA further comprises configuring each service of the SOA to effect in real time both forward processing and reverse processing of a processing step of the business application.

11. The apparatus of claim 7 further comprising sending requests for data processing among the services further comprises sending requests for both real time forward processing and real time reverse processing of a processing step of the business application.

12. The apparatus of claim 7 wherein:
    the SOA is implemented with SOA services comprising interoperable web services;
    the web services are described in Web Services Description Language ('WSDL') and registered in at least one Universal Description, Discovery and Integration ('UDDI') directory;
    the state information includes an identification of a next type of web service to call for a next processing step of the business application;
    executing the business application further comprises looking up in a UDDI directory the next type of web service for the next processing step in the business application; and
    sending requests for data processing among the services further comprises sending the requests as Simple Object Access Protocol ('SOAP') requests for real time execution of a processing step of the business application.

13. A computer program product for deterministic real time stateful business application processing in an otherwise stateless SOA, the SOA comprising SOA services, each SOA service carrying out a processing step of the business application, each SOA service comprising a real time process executable on a real time operating system of a generally programmable computer, the computer program product disposed in a computer readable, recordable medium, the computer program product comprising computer program instructions capable of:

configuring each service of the SOA to record state information describing the state of the service upon completion of a processing step in the business application and provide the state information to a subsequent service, the state information including real time processing information, wherein real time processing information includes a real time processing deadline for each processing step of the business application; and executing the business application in the SOA in real time, including sending requests for data processing among the services, each such request comprising a specification of the state of the executing business application.

14. The computer program product of claim 13 wherein the real time processing information includes a real time processing deadline for the business application.

15. The computer program product of claim 13 wherein the state of the executing business application further comprises a process definition for the business application, a specification of a configuration control version for the business application, a current state of global variables, and a current state of local variables.

16. The computer program product of claim 13 wherein configuring each service of the SOA further comprises configuring each service of the SOA to effect in real time both forward processing and reverse processing of a processing step of the business application.

17. The computer program product of claim 13 further comprising sending requests for data processing among the services further comprises sending requests for both real time forward processing and real time reverse processing of a processing step of the business application.

* * * * *